(12) United States Patent
Molander et al.

(10) Patent No.: US 7,446,769 B2
(45) Date of Patent: Nov. 4, 2008

(54) TIGHTLY-COUPLED SYNCHRONIZED SELECTION, FILTERING, AND SORTING BETWEEN LOG TABLES AND LOG CHARTS

(75) Inventors: Mark E. Molander, Cary, NC (US); Karen Ruth Kluttz, Raleigh, NC (US); Randal Le Bertram, Raleigh, NC (US); David Phillip Johnson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 10/775,376

(22) Filed: Feb. 10, 2004

(65) Prior Publication Data

US 2005/0177790 A1    Aug. 11, 2005

(51) Int. Cl.
*G06T 11/20*    (2006.01)
(52) U.S. Cl. ..................................... 345/440
(58) Field of Classification Search ................. 345/440, 345/440.1, 440.2
See application file for complete search history.

(56) References Cited

U.S. PATENT DOCUMENTS

| | | | |
|---|---|---|---|
| 4,760,458 A | 7/1988 | Watanabe et al. | 358/256 |
| 6,199,070 B1 | 3/2001 | Polo-Wood et al. | 707/202 |
| 7,023,440 B1* | 4/2006 | Havekost et al. | 345/440 |
| 7,050,056 B2* | 5/2006 | Meyringer | 345/440 |
| 7,071,940 B2* | 7/2006 | Malik | 345/440 |
| 2002/0083049 A1 | 6/2002 | Forester et al. | 707/3 |
| 2002/0184068 A1 | 12/2002 | Krishnan et al. | 705/8 |
| 2003/0061209 A1* | 3/2003 | Raboczi et al. | 707/3 |

FOREIGN PATENT DOCUMENTS

| | | | |
|---|---|---|---|
| JP | 4243493 A | 8/1992 |
| JP | 2000200302 A | 7/2000 |

OTHER PUBLICATIONS

"Method for Event Monitoring and Analysis for Check Image Work Flow", IBM Technical Disclosure Bulletin, vol. 38, No. 10, Oct. 1995, pp. 453-455.

* cited by examiner

*Primary Examiner*—Jeffery A. Brier
(74) *Attorney, Agent, or Firm*—Harrington & Smith PC (57) ABSTRACT

In an event detection and monitoring system displaying event data in both tabular and chart formats, the displays of each are tightly-coupled to one another so that when a user selects an event in one format the corresponding event in the other format is highlighted or otherwise emphasized. When a user selects a row containing an event of interest in the event log table, the symbol in the event log chart corresponding to the selected event is simultaneously highlighted. Similarly, when a user selects a symbol in the event log chart corresponding to an event of interest, the row in the event log table containing the corresponding event is simultaneously highlighted. In addition, the rows of the event log table can be sorted and filtered according to predetermined criteria, and the events selected by the filters are highlighted in the chart with indicia distinguishing the filter.

4 Claims, 8 Drawing Sheets

TIGHTLY-COUPLED SYNCHRONIZED SELECTION, FILTERING, AND SORTING BETWEEN LOG TABLES AND LOG CHARTS

FIELD OF THE INVENTION

The present invention relates generally to an event detection and monitoring system and specifically, relates to displaying event data in both tabular and chart formats. The tabular and chart format data are tightly-coupled so that when a user selects an event in one format, the corresponding event in the other format is highlighted.

BACKGROUND OF THE INVENTION

An event detection and monitoring system detects the occurrence of a system event and creates a record of the event. Event log files are created by many different programs to record different types of events for later analysis, and can be sorted and ordered by categories such as time, date, event type, and the like. While log files in tabular format do provide a wealth of information about individual events in isolation, they do not readily illuminate patterns or clusters of events that in the aggregate may help to isolate or narrow a problem that may be causing the events being reported.

When an event occurs that is recorded, relevant information about the event is placed into an event log or log chart, often displayed on a computer screen. Typically, an event log or log chart is a text file with one or more lines of text describing each event. Event logs may also include sorting criteria such as time of the event or of the report, name of the event, type of event, person reporting or on the scene, error code, etc. For a reader seeking a broad overview of numerous events in context with one another, reading the text-based event log presents too much detail and obscures relationships between groups of events. Data from the event log is therefore sometimes put into a graphical format, preferably a chart, that displays only some of the data of the event log for many events simultaneously. The event log may be ongoing and updated as events occur, such as safety system monitoring and maintenance at a chemical manufacturing plant, or it may be a compilation of historical events, such as automated in-flight measurements downloaded from an aircraft after landing for analysis.

One usability problem with log tables (data presented in a tabular format) is that the format makes it difficult for a user to explore the tabular data except as individual entries of discrete events. Log tables may contain hundreds or thousands of rows of entries, which can be tedious for the user to quickly explore or navigate in order to find the desired entry or to identify a pattern of events. Conventional sorting and filtering software and controls can assist in culling the volume of data to absorb, but these do not take advantage of data visualization that can facilitate a data mining and exploring mode of interaction. Conventional sorting and filtering controls assume that users know the information they are searching for and would benefit from exploring general patterns of activity that might be more readily apparent by viewing a chart. Data visualization is a higher-level user interaction approach, and another tool for users in determining and analyzing problems. However, as the user drills down to the root of the problem using the chart presentation, the log table might provide the next level of more detailed information for problem determination. Both types of event log format presentations—tabular and chart—provide different benefits. Tight coupling between log tables and log charts provide the user with a more robust tool, facilitating data exploration and providing synergy.

Currently, there are systems capable of converting data that is in tabular format into chart format. See for example Japanese Patent Nos. 2000200302 by Nishemura Hidenori et al. and U.S. Pat. No. 4,760,458 by Watanabe et al. There are also systems capable of graphing stored data. See for example Japanese Patent No. 4243493A to Nakabayashi Kazunori et al.

There are no currently available systems known to the inventors that are capable of tightly coupling events in a log table to a log chart and events from a log chart to a log table, thereby creating two-way connections. This invention provides a two-way connection between data is a tabular format and data in a chart format.

SUMMARY OF THE INVENTION

The present invention overcomes the individual limitations of a tabular and a graphical presentation format (such as log tables and log charts) by providing a tightly coupled two-way connection between common events depicted on both of them. An event selected from the event log file is shared between the log table and the log chart. A table and chart each carry different information of the same event, and each appeals to different mental processes. For example, a graphical presentation makes patterns of faults more obvious than a columnar series of text entries (depending upon the nature of the pattern and the graph). Based on which display of an event piques a user's interest, an event from that display may be selected and the corresponding event in the other display is automatically highlighted or otherwise visually offset, according to the present invention, for maximizing the information available to the user for that event. The selection can be a single event or multiple events being selected from the table, from the chart, or via the filter from the log file that populates the table and chart. The tight coupling between log tables and log charts is also beneficial when combined with conventional sorting and filtering of the event log table.

The graphical views make user log interactions more valuable than viewing only event log tables. For example, the visual clustering of events around certain time periods readily shows repetitive problems. Such event clustering is more difficult to see in a tabular log thereby making tight coupling of log tables and log charts more valuable to users and administrators.

The present invention is embodied in one aspect as computer program embodied on a computer readable medium. The program includes computer executable instructions for displaying a first portion of the logged event in a tabular format and a second portion of the logged event in a graphical format for each of a plurality of logged or recorded events. The first portion and second portion reflect the concept that each format carries different information of the same event. Where the first portion is the whole, the second portion is a subset of the first portion. Where a parent database carries more detail for each event than is displayed in either format, the first and second portions may be only partial portions of the entire event as recorded in the separate database. The computer executable instructions further cause the display of an event in the graphical format to change in response to at least one event being selected in the tabular format, and also cause the display of an event in the tabular format to change in response to the event being selected in the graphical format. The change in display may be a highlighting or some other visual accentuation to offset the subject event from other displayed events. The present invention also includes the method that is described above as being executed by the computer program, but apart from the computer program embodiment itself.

In another aspect, a computer program embodied on a computer readable medium similar to that described above includes changing the display of a selected event in the graphical format to reflect a modification done to a selected event at the chart format. That is, a user may change a recorded event at the tabular format display, and that change will be automatically reflected in the graphical display.

Another aspect of the present invention is a system for coupling a tabular display to a graphical display. The system includes a computer readable first and second memory that may or may not be separate memory entities, a processor, and an input. The first memory stores a plurality of recorded events, each event having a first portion of data fields and a second portion of data fields. At least one data field is common to both the first and second portion, but the first and second portions are not identical (at least one data field differs). In the Figures described herein, time is the common data field, though that is only illustrative. The processor is coupled to the first memory, and arranges the first portion into a tabular format and the second portion into a graphical format. The tabular and graphical formats are combined into an output signal that, when output to a monitor, enables the monitor to display both formats simultaneously as is shown by way of example in FIGS. 2A-2B. The input is coupled to the processor to receive a first and a second user input. The first user input selects the first portion of one or more recorded events, such as an event displayed in the tabular format. Similarly, the second user input selects the second portion of one or more recorded events, such as an event displayed in the graphical format. A third user input filters the plurality of events according to one of the data fields. The second memory is coupled to the processor, and stores computer instructions that operate in response to the user inputs. Specifically, the computer instructions of the second memory operate to alter the output signal so that the recorded event selected by either of the first or second user input is visually offset from other recorded events in both the tabular format and the graphical format. This is true for both the first and second user inputs, so whether the user selects a recorded event in the tabular format or the graphical format, the selection is reflected in both simultaneously displayed formats. The third user input filters the plurality of events, so the computer instructions of the second memory operate in response to the third user input to alter the output signal so that only a subset of the plurality of recorded events are included in the output signal. That subset is consistent with the filtering of the third user input.

These and additional feature s of the present invention will become more clearly apparent when the following detailed description is read in conjunction with the accompanying drawings.

DETAILED DESCRIPTION OF THE INVENTION

Figure 1:
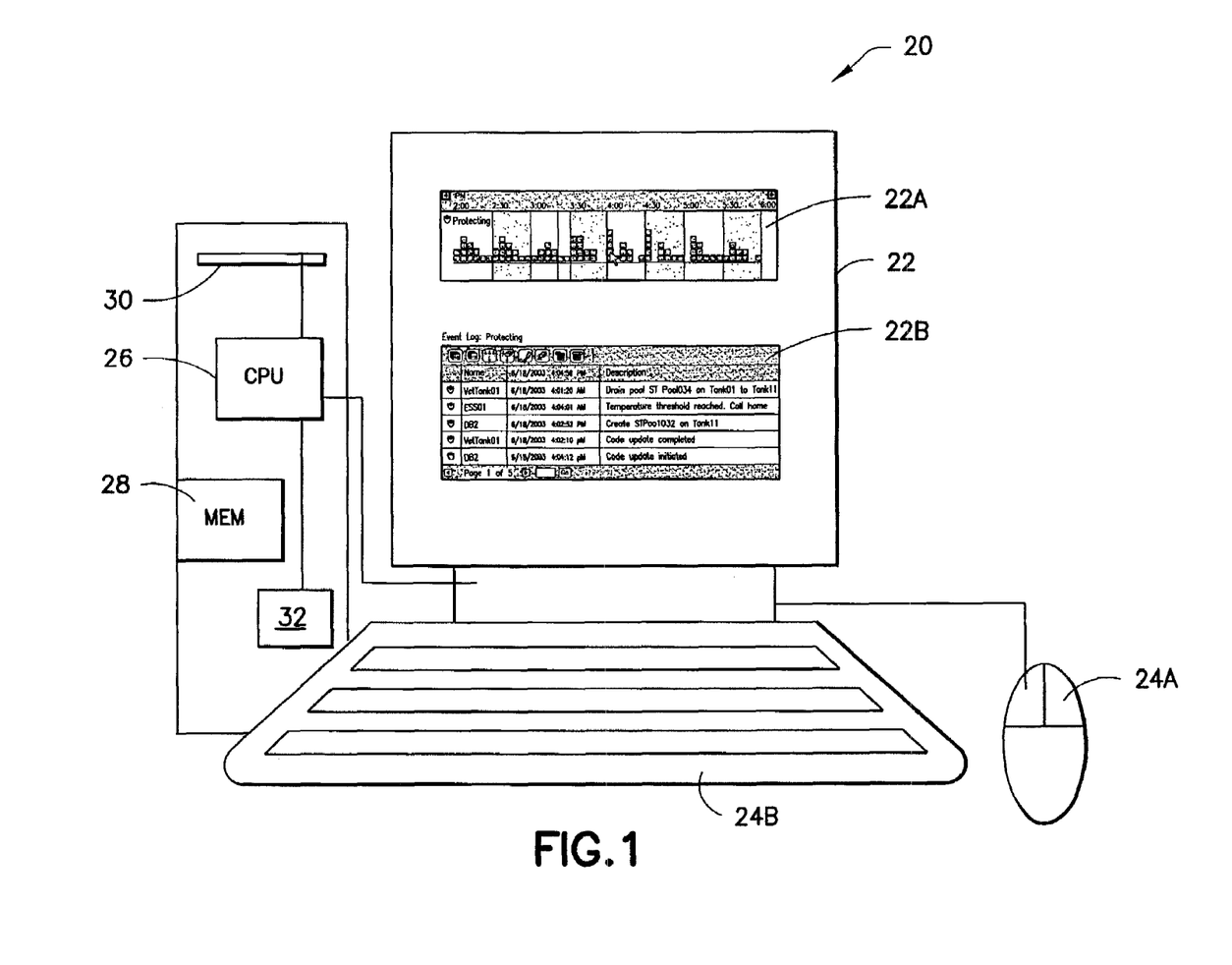
FIG. 1 is a computer system that may be used to practice the present invention and displaying a log chart and log table consistent with the present invention.

The present invention is most advantageously implemented by a computer, and is therefore preferably a computer program (e.g., a set of computer instructions) embodied on a computer readable medium such as a PC or server hard drive, a magnetic tape or disk, an optical disk, an electronic media such as a memory stick, or the like. The computer instructions cause the computer to execute various steps to practice the invention as detailed in this disclosure and claims. One suitable computer system 20 is illustrated in FIG. 1 having a display such as a CRT or plasma screen that simultaneously displays a log chart 22A and a log table 22B, which are different representations of the same underlying data. The computer system further includes a user interface such as a mouse 24A and keyboard 24B, at least one data processor CPU 26, a memory 28, and a display driver 32. The system 20 may also include a drive 30 for reading removable computer storage media such as magnetic diskettes, optical disks, magnetic tapes, flash memory sticks, and the like. The present invention embodied on a computer readable medium may be within one of those removable mediums, or may be within a non-removable medium such as the memory 28 depicted, or may be stored at a remote memory location such as a server and accessed by the described computer system 20 via a network.

Figures 2A, 2B:
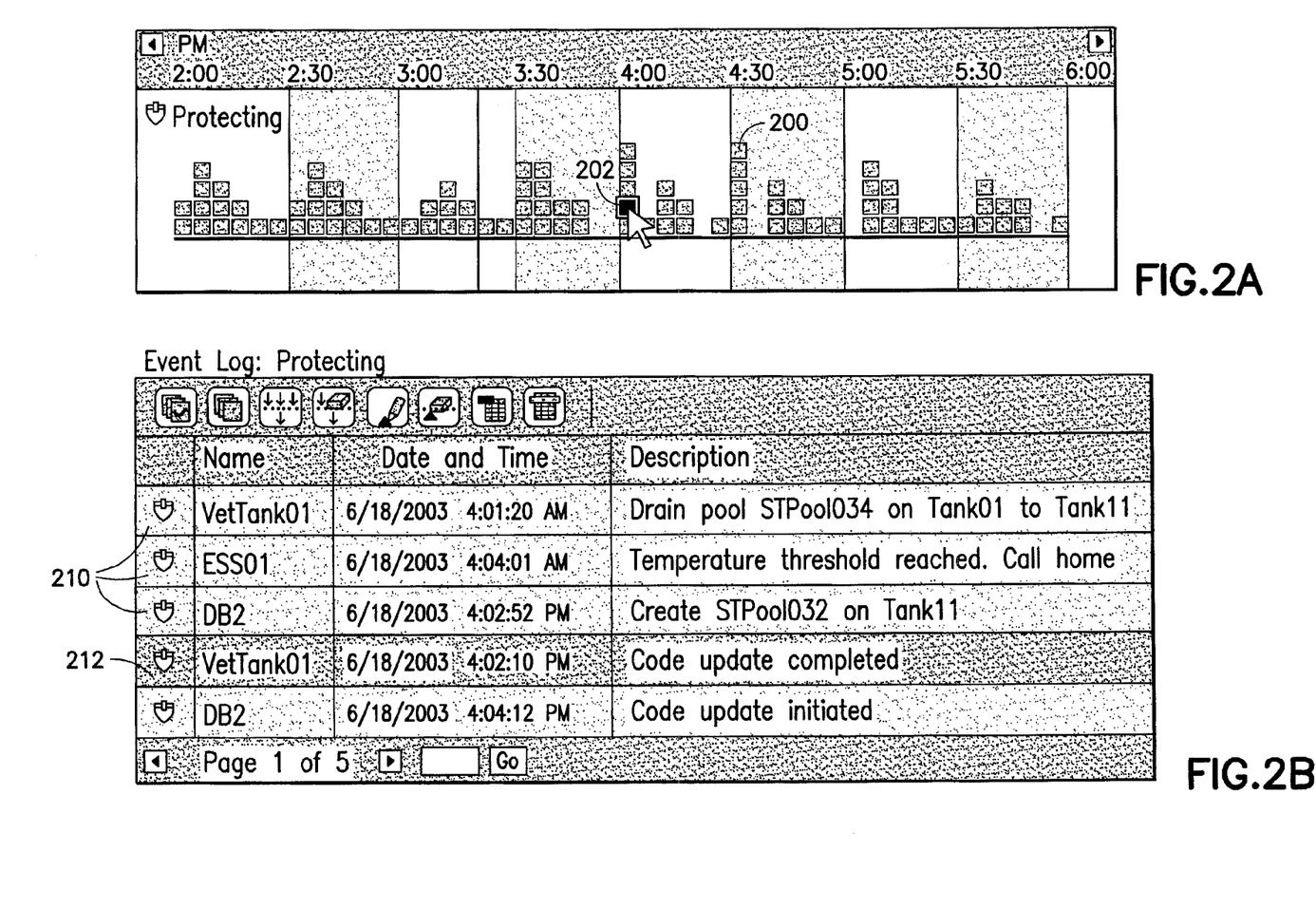
FIG. 2A is a graphical representation of events and alerts shown along a time line.
FIG. 2B is a tabular representation of some of the events and alerts shown in FIG. 2A.

FIG. 2A shows in particular a graphical representation in chart format of events and alerts along a time line. An event is a report of a single coherent occurrence, such as a line pressure at a particular location, a lockout of an electrical panel, injection of a liquid into a mold at a measured temperature, an addition of a chemical to a vat, etc. Events that require user intervention may be referred to as alerts, such as an overvoltage at an electrical monitoring point (regardless of automatic safety mechanisms to reduce immediate risks), an elevator stuck between floors, or a low fluid level in a car reported in response to an electronic inquiry. Clearly, events and alerts include a vast array of possibilities, and are often represented by some automated industrial or commercial process. Events and alerts deemed important by some supervisory body or product designer are logged in whatever detail is deemed most valuable, and the increasing automation of logging certain events (pressures, voltages, volumes, robotic actions, etc.) have led to increasing volumes of data being recorded.

Typically, logged events are sorted by the time of occurrence. Each box or block 200 corresponds to the occurrence of an event or an alert entered into the events log files. The width of the box corresponds to a particular time interval. When multiple events or alerts occur during the same time interval, the boxes are stacked to provide a visual presentation of multiple event occurrences during the same time interval. While boxes or blocks are shown, any other symbol may be used to indicate the occurrence of an event or alert. In addition, events and alerts can have different shapes or colors in the chart so that a user's attention is drawn to events or alerts that require intervention by the user. FIG. 2B shows a portion of a tabular listing that details the events and alerts of FIG. 2A. Each row 210 corresponds to an individual event occurrence. The table includes information regarding the type, name, date and time, and written description of each event or alert shown in FIG. 2A.

As events are detected, they are simultaneously added to the event log chart and to the event log table. For example, assume the box 202 outlined in the chart of FIG. 2A corresponds to the selected entry 212 that is highlighted in the event log table of FIG. 2B. The present invention provides a two-way coupling between the graphical presentation (FIG. 2A) and the tabular presentation (FIG. 2B) to permit a user to select an event in a first format, either the chart or in the table, and to have automatically highlighted (or otherwise flagged) the corresponding symbol or row of the selected event in the other format. In practice, the user can select an event in the chart and then drill down and explore events in the chart. Simultaneously, the row in the table containing the event corresponding to each event selected in the chart is highlighted in the table. Alternatively, the user is able to track events or alerts in the table and as a row of the table is selected, the symbol in the chart corresponding to the event selected in the table is highlighted.

When a user selects a row containing an event of interest in the table, the symbol in the chart corresponding to the selected event is simultaneously updated and highlighted. Alternatively, the user can select the symbol in the chart for an event and the row in the table containing that event is simultaneously highlighted. Selection of a box in the chart corresponding to an event is a common investigatory technique and the corresponding row in the table is highlighted during the "fly-over" of the chart.

It is possible to sort the events in the table and simultaneously and synchronously highlight the corresponding symbols in the chart. For example, it is possible to sort events according to event type. The left-most column of the table in FIG. 2B includes symbols corresponding to different types of events and alerts. Sorting alerts so that they are listed at the top of the event log table, for example, is useful for the user to determine what actions are required and which actions require immediate attention. The symbols in the chart corresponding to the alerts sorted at the top of the log table are highlighted in the chart for drawing the attention of the user to those alerts. Sorting items within a table does not select any particular item, but simply reorders the rows of event data.

It is also possible to filter events. Assume, for example, that there is a pool problem. The user filters the words in the description field of the events table in FIG. 2B for the word "pool". Only those events in the table having the word "pool" in the description field will be displayed in the table. Simultaneously, those symbols or boxes in the chart corresponding to the events selected by the filter are highlighted in the chart. The graphical format shows the events selected by the filter in relation to the whole set of events. This view in relation to the whole provides a context and additional higher-level information to the user.

In an alternative embodiment of the invention, multiple filtering of the table of events is performed with the boxes corresponding to the different filtered results being displayed in different colors (and/or shapes or other distinguishing indicia) to make evident the results of each of the multiple filters. For example, protection-related events could be shown with one color while heal-related events could be shown in another color, thereby enabling the user to quickly correlate between the events themselves. Accordingly, protect-related events can be attended to before heal-related events.

The invention is embodied by event log data in both a chart format and a table format. The processes for preparing the event logs in both tabular and chart formats are depicted in the flowchart 300 in FIG. 3. The process is performed by software controlling the event detection and monitoring system. In step 301 a conventional event log file is opened. The present invention includes parsing logic for the format of the given log file so that one event at a time can be read and interpreted. At step 302, the log file is examined to ascertain whether a new event has been added, which is read at step 303 if present. An event is added as a symbol to the chart in step 304 and a new row is added to the table in step 305 corresponding to the event read from the log file. Each event in the log file will be represented by both a symbol in the chart and a row in the table. After each symbol and row pair is added, a check is made in step 302 to determine if there are additional events in the event log file that have not yet been added to the chart and table. If there are additional events, the next event is read from the event file log in step 303 and added to the chart in step 304 and to the table in step 305. The checks and the addition processes continue until there are no additional events in the event log file that have to be added to the chart and to the table at which time the process is done in step 306.

Figure 3:
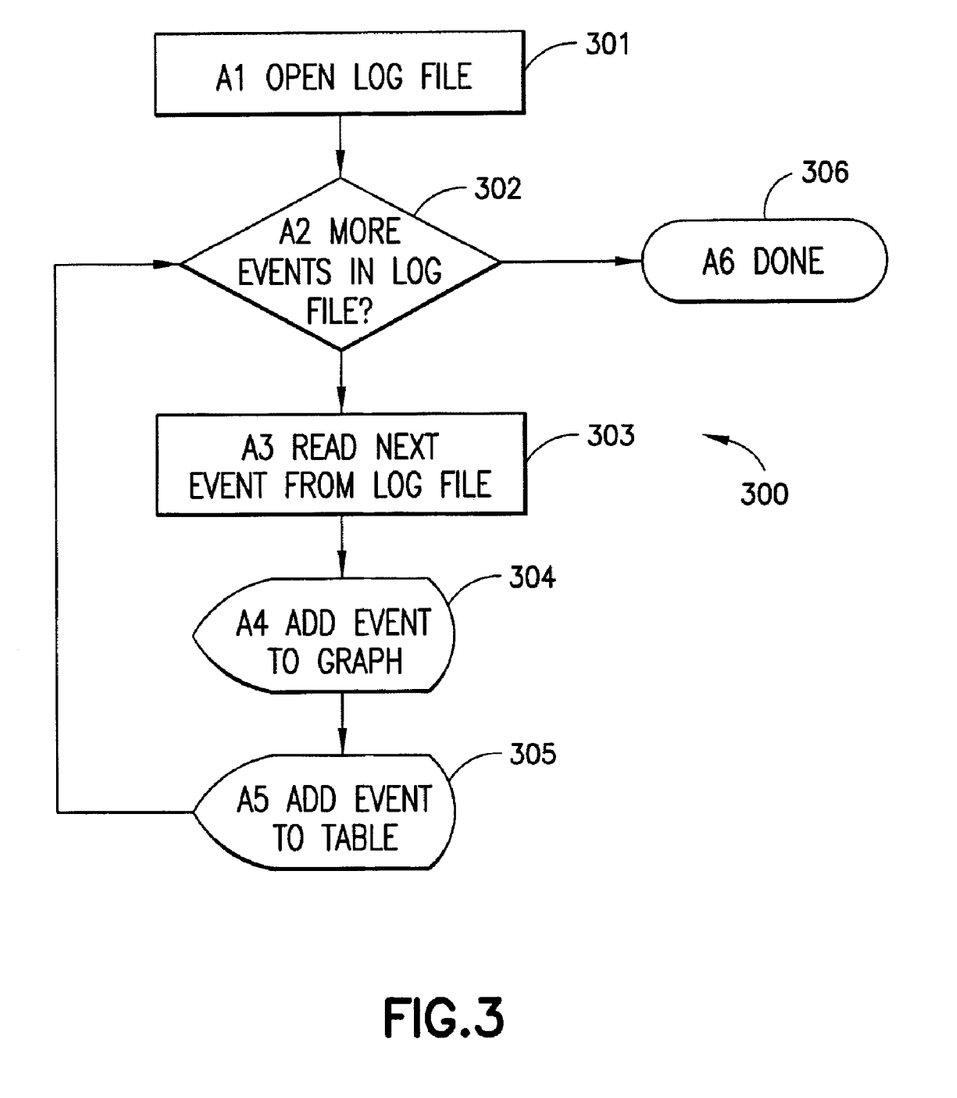
FIG. 3 is a flow chart depicting the process for adding events to a log chart and to a log table.

It is noted that FIG. 3, and this detailed description, presume that events are not originally entered in the log table but rather in a separate event log from which the log file is populated. This is a typical arrangement, in that many events are automatically performed and entered in an event log, or events are added to an event log from many disparate entry points. Where entries are made directly to the log table (e.g., where the log table serves as the event log), steps 302-303 of FIG. 3 refer to the log table and step 305 is deleted. Similar changes to other portions of this description are relevant where the log table and the event log are one and the same. Both the log table and event log are primarily if not exclusively text documents that list events by line entries.

Figure 4:
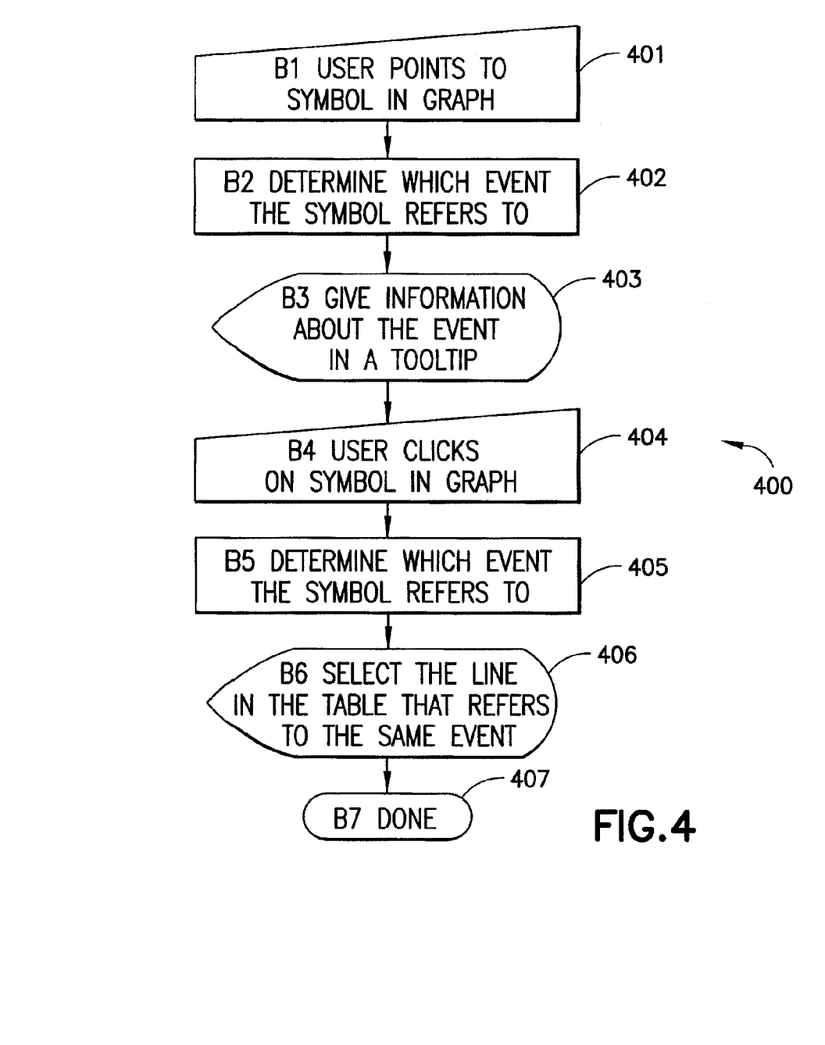
FIG. 4 is a flow chart depicting the process for viewing both a log chart and a log table from a user operating only on the log chart.
Figure 5A:
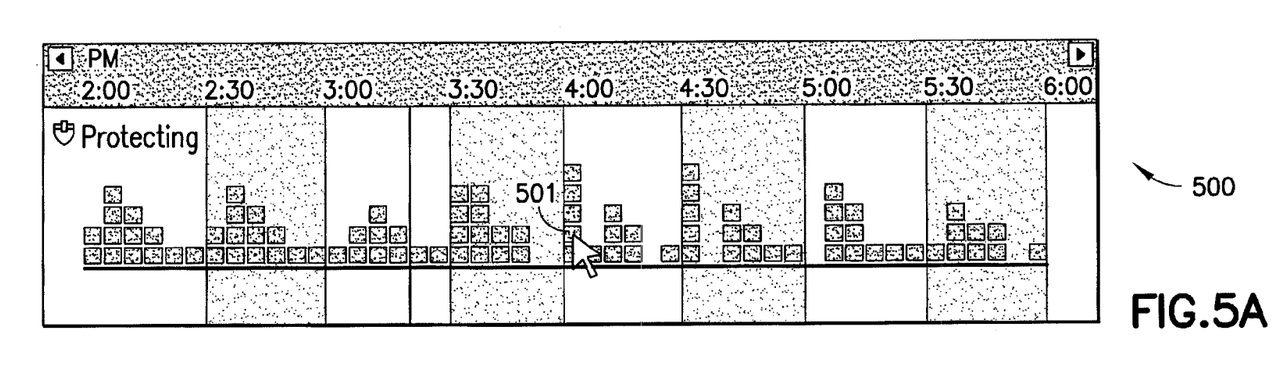
FIG. 5A is a log chart operated on by a user in accordance with FIG. 4.
Figure 5B:
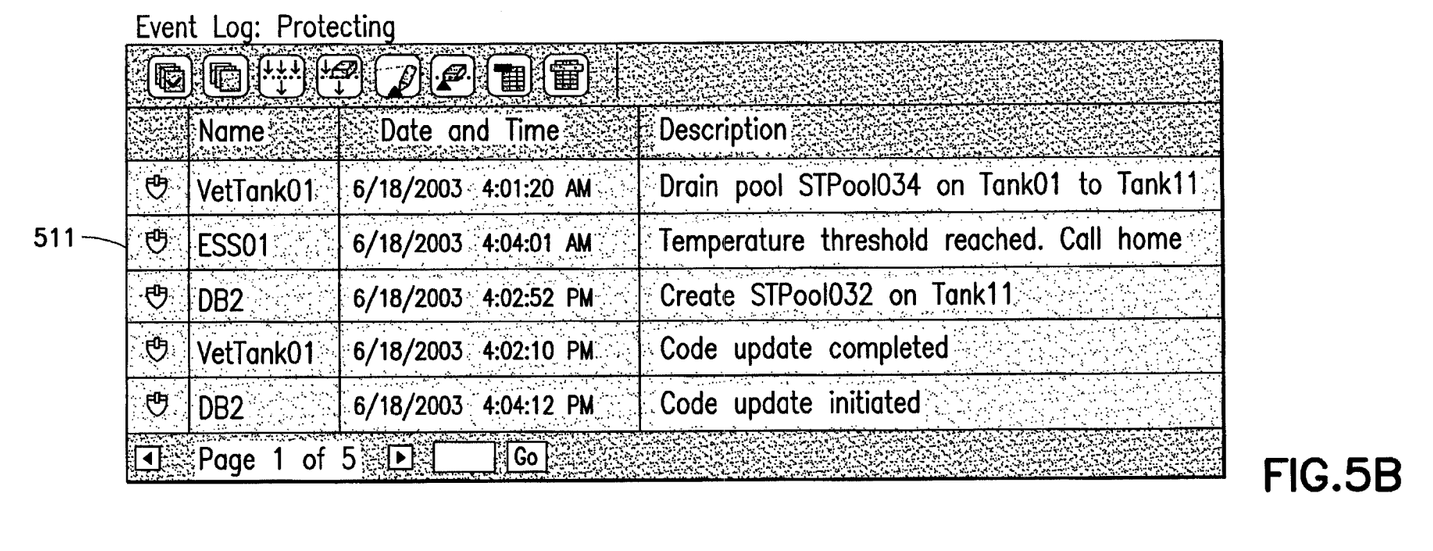
FIG. 5B is a log table automatically highlighted in response to the user's operation on the log chart of FIG. 5A.
Figure 6:
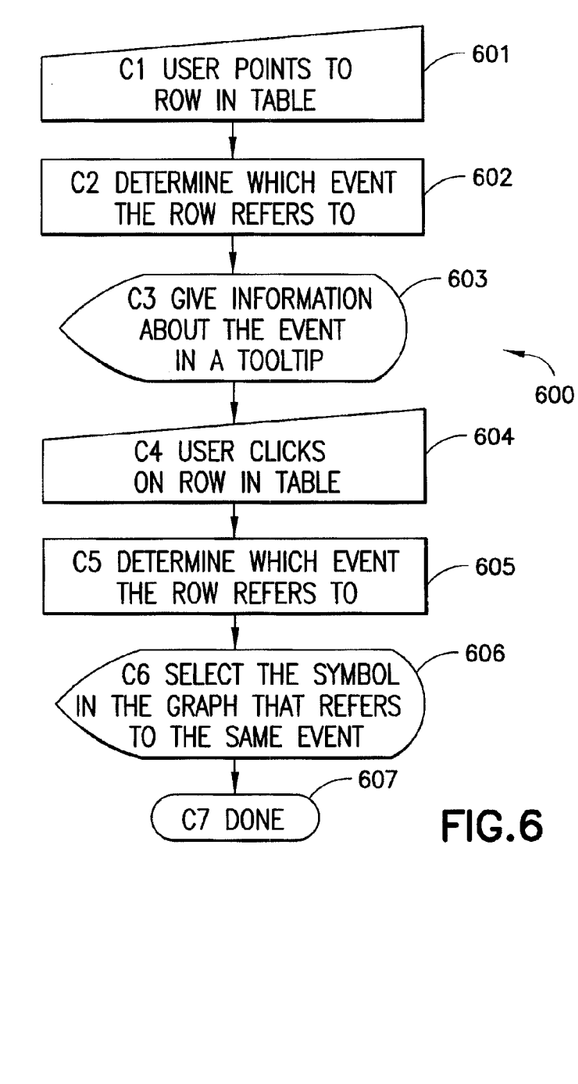
FIG. 6 is a flow chart depicting the process for viewing both a log chart and a log table from a user operating only on the log table.
Figure 7A:
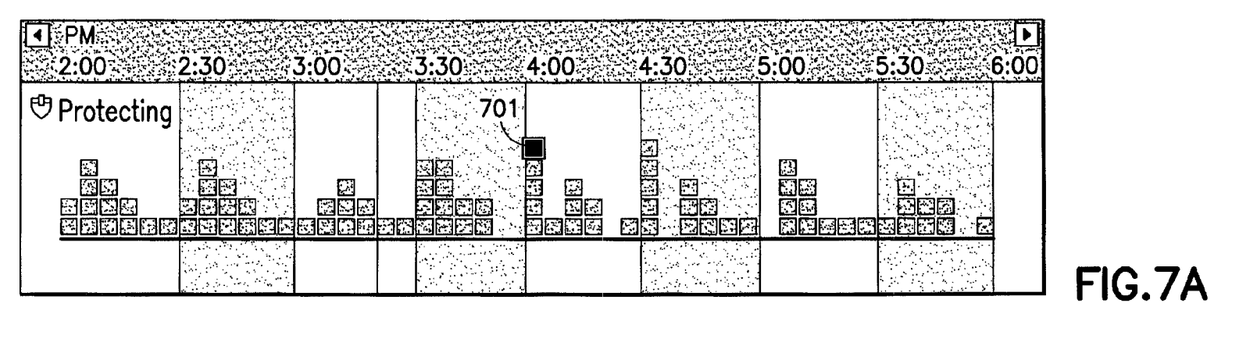
FIG. 7A is a log chart automatically highlighted in response to the user's operation on the log table of FIG. 7B in accordance with the flow chart of FIG. 6.
Figure 7B:
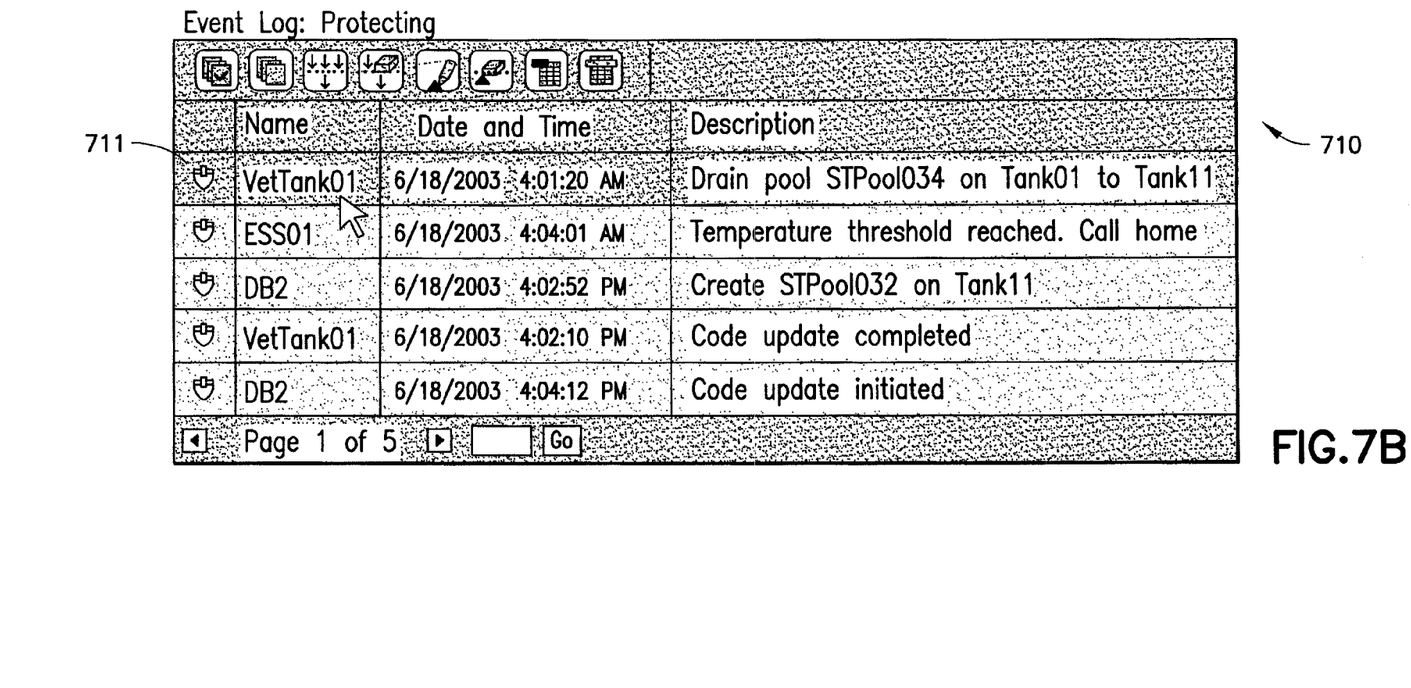
FIG. 7B is a log operated on by a user in accordance with FIG. 6.

The simultaneous selection of events in a log chart and a log table, when a user interacts with only one of them, is described in conjunction with the flow chart 400 in FIG. 4 (and accompanying FIGS. 5A-5B) and the flow chart 600 of FIG. 6 (and accompanying FIGS. 7A-7B).

FIG. 4 is a flow chart describing steps to display, on both a log chart and the log table, an event that a user selects only from a log chart. FIG. 4 is best understood with reference to the log chart of FIG. 5A and the log table of FIG. 5B. Referring to the flow chart 400, in step 401 the user positions a mouse pointer next to a desired symbol displayed on the chart 400, such as the block 501 of the log chart 500. In step 402, a determination is made regarding which event corresponds to the selected symbol. In step 403, information regarding the desired event is displayed in a tooltip next to the pointer, preferably only after the pointer remains stationary for a minimum threshold of time. Subsequently, the user selects the symbol 501 by clicking on the mouse button in step 404.

In step 405, a determination is made regarding which event corresponds to the selected symbol 501. The row 511 in the log table of FIG. 5B that corresponds to the selected symbol 501 (and to the event represented by that symbol 501) is highlighted or otherwise identified at step 406. The process is completed at step 407.

FIG. 6 is a flow chart describing steps to display, on both a log chart and the log table, an event that a user selects only from a log table. FIG. 5 is best understood with reference to the log chart of FIG. 7A and the log table of FIG. 7B. Referring to the flow chart 600, the user positions a mouse pointer at a row containing a desired event, such as the indicated row 711 of the log table 710 of FIG. 7B. A determination is made in step 602 regarding which event corresponds to the selected event in row 711. In step 603, information regarding the event is displayed in a tooltip next to the mouse pointer, preferably only after the pointer remains stationary for a minimum threshold of time as noted above. Subsequently, the user selects the desired row 711 by clicking on the mouse button in step 604. In step 605, a determination is made regarding which event corresponds to the selected row 711. The symbol 701 in the log chart of FIG. 7A that corresponds to the selected row 711 (and to the event represented by that row 711) is highlighted or otherwise identified at step 606. The process is completed at step 607.

Figure 8A:
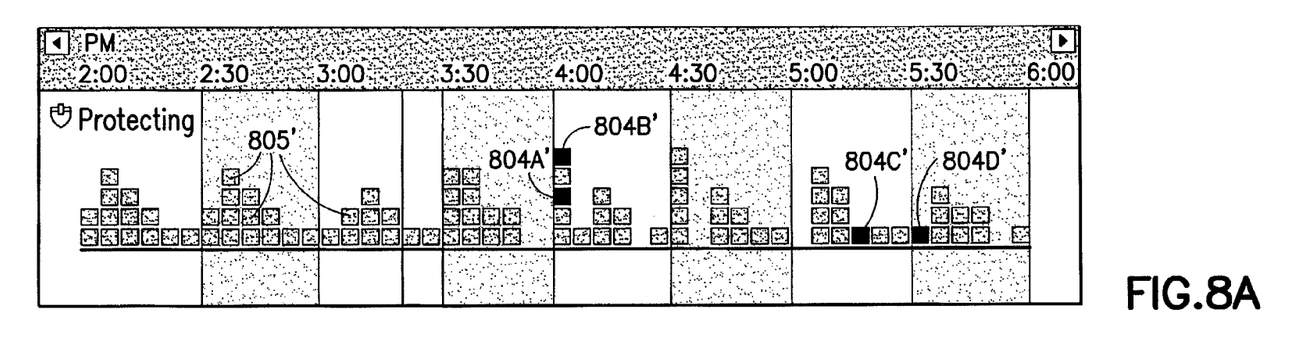
FIGS. 8A and 8B is a log chart and log table, respectively, showing that events selected by a filter at the log table are highlighted in both the log table and log chart.
Figure 8B:
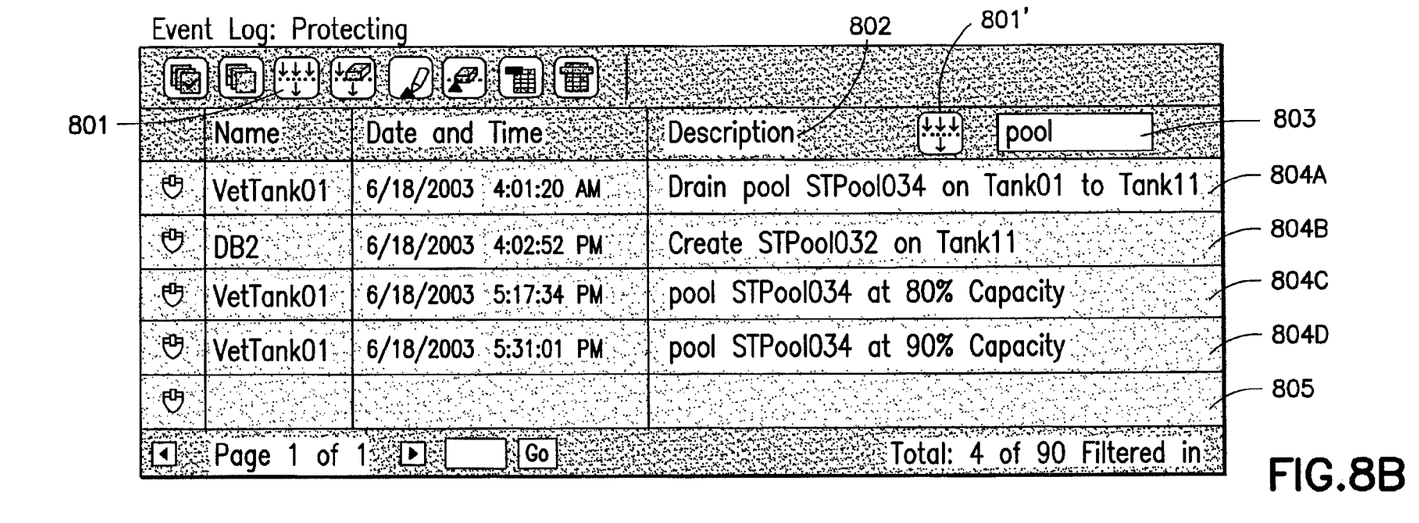

FIGS. 8A-8B illustrate filtering according to one embodiment of the present invention. A user selects at the log table of FIG. 8B a filter icon 801, drags it to a column header of a category 802, and types a filter criteria ("pool") into a filter parameter block 803. The filter parameter block 803 may allow text entries as illustrated, or may allow the user to select from a fixed list of options, such as a pulldown list. Certain filters may require actuation (such as clicking the icon 801' nearest the filter parameter block 803, or depressing an enter or return key), while others may take effect as the entry to the filter parameter block 803 is made. Regardless, the filter searches for and retrieves only those events that pass the filter. In FIG. 8B, events 804A, 804B, 804C, and 804D each bear the filter parameter "pool" in the description category, and thus satisfy the chosen parameter. Events that pass the filter are marked with an indicia that distinguishes the permitted filtered-in events from the denied filtered-out events. For example, the filtered-in events 804A-D may be distinguished by a darkened background, an outline, being displayed at the top of the log chart, etc. They may also be distinguished by a change to the display of all filtered-out events 805, such as the filtered-out events 805 being eliminated from view (the visible horizontal lines blanked as in FIG. 8B), changed to a reduced contrast or brightness, and the like.

Commensurate with the filtering and distinguishing of events 804A-D in the event log of FIG. 8B, the corresponding events 804A', 804B', 804C', and 804D' are similarly distinguished from the filtered-out events 805' in the event chart of FIG. 8B. The particular distinguishing indicia used for the log chart preferably but not necessarily carries over to the log table. As illustrated in FIG. 8A, it is preferable that the filtered-out events 805' still be displayed to provide context for the filtered-in events 804A'-D'. FIG. 8A shows four filtered-in events 804A'-D' dispersed among 86 filtered-out events 805'. Such a multi-event view frequently isolates problems or causal relationships among events more effectively than displaying the filtered-in events 804A'-D' in isolation. Preferably, the display of the log table that distinguishes filtered-in events 804A-D from filtered-out events 805 occurs simultaneously with the display of the log chart that distinguishes filtered-in events 804A'-D' from filtered-out events 805'. The user inputs 801, 801', 803 for the filter may be incorporated into the display of the log table as illustrated in FIG. 8B, or of the log chart, or of the display of both or neither (a separate filter display).

Figure 9A:
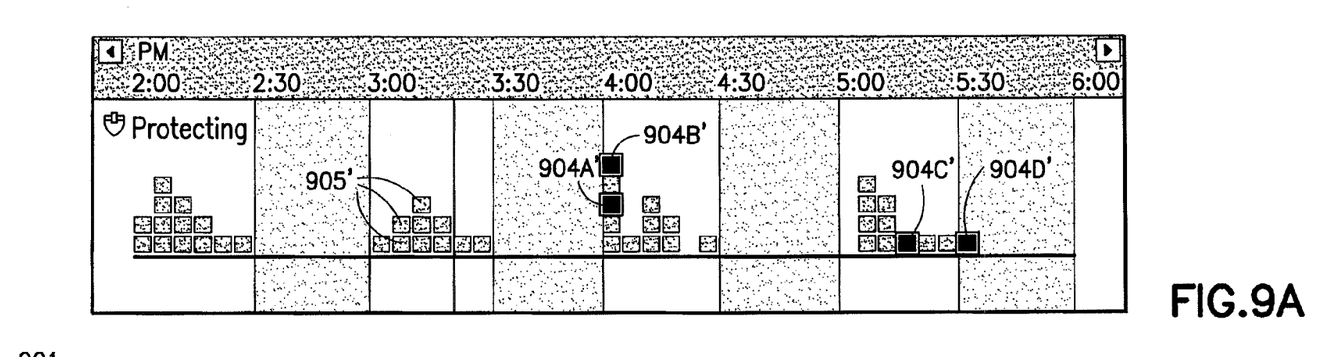
FIGS. 9A and 9B are similar to FIGS. 8A and 8B, respectively, showing further action taken at the log table causes the relevant events to be emphasized and the non-relevant events to be de-emphasized in both the log table and log chart.
Figure 9B:
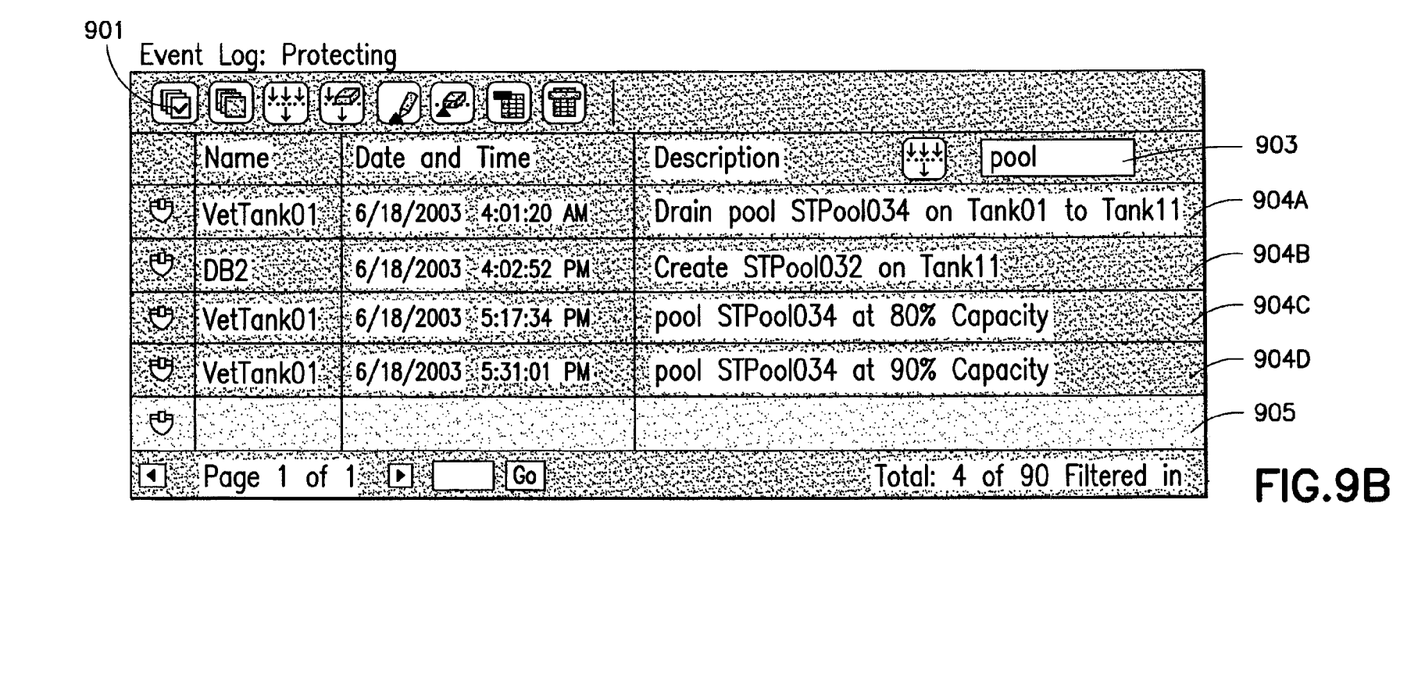

Once one or more events 804A-D, 804A'-D' are displayed after the filtering of FIGS. 8A-B, the user may choose to operate on only the filtered-in events, possibly by a pattern or relation that is revealed or suspected from the log chart of FIG. 8A. This occurs in FIG. 9A-9B, where the user can 'drill-down' into the data of the filtered-in events to find more revealing commonalities or lack thereof. In the log chart of FIG. 9B, a user may click a 'select all' icon 901 which limits at least the next operation (e.g., another filter, copying the data to another storage location, activating a probe, marking filtered-in events for a report) to only those events currently displayed in the table, which is all the filtered-in events. In the example of FIG. 9B, filtering by another parameter 903 operates only on the selected events 904A-D in the log table and the corresponding selected events 904A'-D' in the log chart. Preferably, the 'select all' command further changes the display of either or both of the filtered-in events 904A-D, 904A'-D' and the non-selected events 905, 905' as compared to their display previous to the 'select all' choice. Distinguishing indicia such as those listed above in relation to FIGS. 8A-B may be used.

The invention is capable of providing tight-coupling, two-way connection and synchronous selection (and viewing) of events between the tabular format and chart format as described above. That is, the same event is indicated in both formats, regardless of whether a row is selected in the table or a symbol is selected in the chart. The same tight coupling, two-way connection between the event log table and event log chart is also accomplished when the rows of the event log table are sorted or filtered in a conventional manner.

In the above manner, the present invention enables a user to manipulate either a tabular or a graphical presentation of the same underlying data, and view the result of the manipulation in both the tabular and graphical presentations. Where one presentation type better indicates to a user an area or event of interest (as in a pattern visible in a graphical format), the user may select one or more events in that presentation type and automatically have presented the additional information made apparent by the other presentation type (as in detailed text of a columnar entry in a table). The two-way communication between the presentations enables greater latitude in the user's ability to first identify events or groups of events of interest.

While there has been described and several illustrated embodiments of the present invention, it will be apparent to those skilled in the art that variations and modifications are possible without deviating from the spirit and broad scope of the invention which shall be limited solely by the scope of the claims appended hereto.

What is claimed is:

1. A method for manipulating a display of a plurality of events logged in a database comprising:

for each of the plurality of logged events, displaying at least a first portion of the logged event in a tabular format and at least a second portion of the logged event in a graphical format;

in response to at least one event being selected in the tabular format, changing the display of the corresponding at least one event in the graphical format;

in response to at least one event being selected in the graphical format, changing the display of the corresponding at least one event in the tabular format;

filtering the plurality of logged events by a filter criteria entered within the displayed tabular format, where the filter criteria comprises a user text entry and a user selection from a fixed pulldown list of options;

displaying the logged events that pass the filtering and the logged events that do not pass the filtering in both the tabular format and the graphical format while automatically distinguishing by a displayed distinguishing indicia the logged events that pass the filtering from the logged events that do not pass the filtering in both the tabular format and the graphical format; and displaying, in the graphical format, the logged events that comprises an alert requiring a user input with an indicia identifying the event as an alert and also the logged events that do not require an alert without the indicia, where the indicia comprises at least one of a shape, color, contrast and outline of a graphical symbol.

2. The method of claim 1 where the graphical format defines a first axis representing time in consecutive discrete time intervals and a second axis, wherein a first and second logged event occurring within a common discrete time interval are displayed as discrete boxes stacked along the second axis.

3. The method of claim 1 further comprising:
prior to an event becoming a selected event, displaying a tooltip proximal to the event in the graphical format that includes at least a text entry of the first portion of the event from the event log.

4. The method of claim 1 where changing the display of the corresponding at least one event comprises highlighting the corresponding at least one event.

* * * * *